United States Patent
Choi

(10) Patent No.: US 9,094,885 B2
(45) Date of Patent: Jul. 28, 2015

(54) APPARATUS AND METHOD FOR SUPPORTING HANDOFF BETWEEN HETEROGENEOUS NETWORKS IN PORTABLE TERMINAL

(75) Inventor: Taek-Kyun Choi, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 260 days.

(21) Appl. No.: 13/358,375

(22) Filed: Jan. 25, 2012

(65) Prior Publication Data

US 2012/0188982 A1    Jul. 26, 2012

(30) Foreign Application Priority Data

Jan. 26, 2011 (KR) .................. 10-2011-0007688

(51) Int. Cl.
| | |
|---|---|
| *H04W 76/04* | (2009.01) |
| *H04W 76/06* | (2009.01) |
| *H04W 84/12* | (2009.01) |
| *H04W 88/06* | (2009.01) |
| *H04W 36/14* | (2009.01) |
| H04W 76/02 | (2009.01) |

(52) U.S. Cl.
CPC .............. *H04W 36/14* (2013.01); *H04W 76/02* (2013.01); *H04W 76/04* (2013.01); *H04W 76/06* (2013.01); *H04W 84/12* (2013.01); *H04W 88/06* (2013.01)

(58) Field of Classification Search
CPC . H04W 36/0027; H04W 36/14; H04W 76/02; H04W 76/04; H04W 76/06; H04W 88/06; H04W 84/12
USPC .................... 370/331; 455/436, 442
See application file for complete search history.

(56) References Cited

U.S. PATENT DOCUMENTS

| | | | |
|---|---|---|---|
| 2004/0151136 A1* | 8/2004 | Gage ............................ | 370/328 |
| 2006/0116127 A1* | 6/2006 | Wilhoite et al. .............. | 455/442 |
| 2006/0291489 A1* | 12/2006 | Naqvi et al. .................. | 370/401 |
| 2007/0133572 A1* | 6/2007 | Bloebaum et al. ............ | 370/400 |
| 2008/0232272 A1* | 9/2008 | Gelbman et al. .............. | 370/254 |

* cited by examiner

*Primary Examiner* — Jianye Wu

(57) ABSTRACT

A portable terminal is configured to support a handoff between heterogeneous networks. The portable terminal includes a first communication unit, a second communication, a coverage identifying unit, and a switching unit. The first communication unit communicates with a mobile communication network. The second communication unit communicates with a heterogeneous network. The coverage identifying unit identifies entry of the portable terminal into a heterogeneous network area while performing a call connection through the mobile communication network. The switching unit attempts call connection through the heterogeneous network while maintaining the call connection through the mobile communication network when the entry of the portable terminal into the heterogeneous network area is identified. When a response to the call connection through the heterogeneous network is received, the switching unit terminates the call connection through the mobile communication network and maintains the call connection through the heterogeneous network.

20 Claims, 5 Drawing Sheets

APPARATUS AND METHOD FOR
SUPPORTING HANDOFF BETWEEN
HETEROGENEOUS NETWORKS IN
PORTABLE TERMINAL

CROSS-REFERENCE TO RELATED
APPLICATION(S) AND CLAIM OF PRIORITY

The present application is related to and claims the benefit under 35 U.S.C. §119(a) of a Korean patent application filed in the Korean Intellectual Property Office on Jan. 26, 2011 and assigned Serial No. 10-2011-0007688, the entire disclosure of which is hereby incorporated by reference.

TECHNICAL FIELD OF THE INVENTION

The present invention relates to an apparatus and a method for a handoff in a portable terminal. More particularly, the present invention relates to an apparatus and a method for maintaining a call connection through a wireless LAN network when a portable terminal maintaining the call connection through a mobile communication network moves into a wireless LAN area.

BACKGROUND OF THE INVENTION

Recently, a portable terminal has become a necessity in a modem life, enjoyed by everyone regardless of age or gender. Accordingly, service providers and portable terminal manufacturers competitively develop products (or services) that can differentiate themselves from others.

For example, the portable terminal has developed into a multimedia device in which a phonebook, game, SMS, e-mail, wake-up call, MP3, calendar, digital camera, multimedia messaging and wireless internet service are available, to provide a variety of services.

In order to ensure mobility of the portable terminal, the portable terminal provides a handoff technology, which maintains a call connection by connecting a call to an adjacent base station instead of disconnecting the call when the portable terminal moves outside a service area of a serving base station currently engaged in a communication.

In addition, the portable terminal provides a voice service through a circuit switched network including a public switched telephone network (PSTN) and provides a packet service through an internet protocol (IP) network including Internet or packet switched data network (PSDN). Also, the portable terminal provides a VoIP function to provide the voice service through IP network. Due to advancement of the IP network such as Internet and overcoming a limitation of a voice bandwidth of 56 kbps in the circuit switched network, the VoIP function can enable a high quality voice call as well as an international call with a low cost internet fee. The VoIP functionality can also be provided through a wireless local area network (WLAN).

Accordingly, when a wireless LAN network capable of performing the VoIP function is available, a user of the portable terminal may want to use the voice service over the wireless LAN network instead of the mobile communication network; however, in order to use the VoIP function during when a call connection is being performed, the call connection that is already established needs to be disconnected to perform the VoIP function.

In other words, the portable terminal supports only for a handoff within the mobile communication network or within the wireless LAN network but does not support the handoff between the mobile communication network and the wireless LAN network so that the call connection that is already established needs to be terminated.

Accordingly, in order to solve the above problem, there exists a need for an apparatus and a method for performing a handoff between the mobile communication network and the wireless LAN network without requiring disconnecting a call.

SUMMARY OF THE INVENTION

To address the above-discussed deficiencies of the prior art, it is a primary object to provide at least the advantages described below. Accordingly, an aspect of the present invention is to provide an apparatus and a method for maintaining a call connection without disruption in a portable terminal that moves between a wireless LAN and a mobile communication network.

Another aspect of the present invention is to provide an apparatus and a method for performing a handoff to a wireless LAN network in a portable terminal.

Another aspect of the present invention is to provide an apparatus and a method for attempting a call connection through a heterogeneous network while maintaining a call connection that is already established when a portable terminal moves into the heterogeneous network.

Another aspect of the present invention is to provide an apparatus and a method for terminating a call connection that is already established after attempting a call connection through a heterogeneous network.

In accordance with an aspect of the present invention, an apparatus for supporting a handoff between heterogeneous networks in a portable terminal is provided. The apparatus includes a first communication unit configured to communicate with a mobile communication network, a second communication unit configured to communicate with a heterogeneous network, a coverage identifying unit configured to identify an entry of the portable terminal into a heterogeneous network area while performing a call connection through the mobile communication network, and a switching unit configured to attempt a call connection through the heterogeneous network while maintaining the call connection through the mobile communication network when the entry of the portable terminal into the heterogeneous network area is identified, wherein, when a response to the call connection through the heterogeneous network is received, the switching unit terminates the call connection through the mobile communication network and maintains the call connection through the heterogeneous network.

In accordance with another aspect of the present invention, a method of supporting a handoff between heterogeneous networks in a portable terminal is provided. The method includes: identifying an entry of the portable terminal into a heterogeneous network area while performing a call connection through a mobile communication network, attempting a call connection through the heterogeneous network while maintaining the call connection through the mobile communication network when the entry of the portable terminal into the heterogeneous network area is identified, and terminating the call connection through the mobile communication network and maintaining the call connection through the heterogeneous network when a response to the call connection through the heterogeneous network is received.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure.

Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, an apparatus and a method for allowing a handoff between a wireless LAN and a mobile communication network will be described. Here, when a portable terminal moves into a wireless LAN area during a call, a handoff between the wireless LAN and the mobile communication network is performed to maintain a call by using the wireless LAN network, which is low cost. Alternatively, when the portable terminal moves from the wireless LAN area to a mobile communication network area during a call, the handoff is performed to maintain the call by using the mobile communication network.

Figure 1:
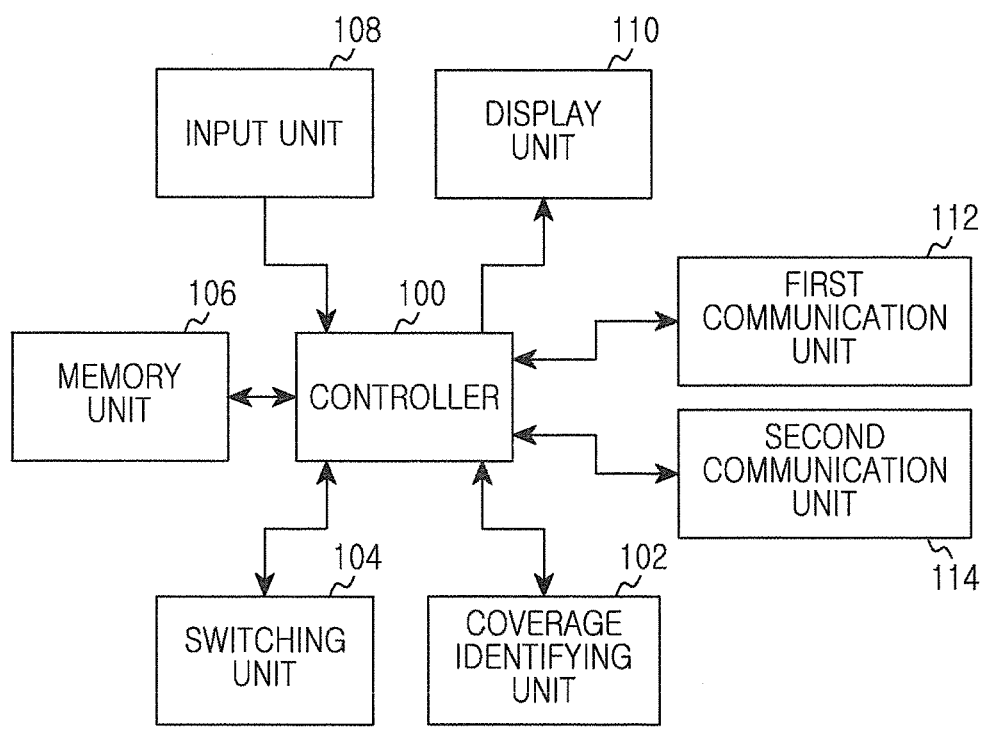
FIG. 1 illustrates a configuration of a portable terminal that allows a handoff between a wireless LAN and a mobile communication network according to the present invention.

FIG. 1 illustrates a configuration of a portable terminal that allows a handoff between a wireless LAN network and a mobile communication network according to the present invention.

Referring to FIG. 1, the portable terminal includes a controller 100, a coverage identifying unit 102, a switching unit 104, a memory unit 106, an input unit 108, a display unit 110, a first communication unit 112 and a second communication unit 114.

First, the controller 100 of the portable terminal controls an overall operation of the portable terminal. For example, the controller 100 handles processing and control for voice call and data communication. In addition to normal features of the portable terminal, the controller 100 identifies movement of the portable terminal during a call connection and allows the handoff between the wireless LAN and the mobile communication network so that the call connection may not be disrupted.

That is, when the portable terminal moves to the wireless LAN area while engaging the call connection through the mobile communication network, the call connection is performed through the wireless LAN network, which is low cost.

The coverage identifying unit 102 detects strength of a heterogeneous network signal to identify the movement of the portable device. According to an exemplary embodiment of the present invention, the coverage identifying unit 102 detects the strength of a wireless LAN signal to identify whether the portable terminal enters into or moves out of the wireless LAN area.

The switching unit 104 controls an operation of a communication module corresponding to the movement of the portable terminal identified by the coverage identifying unit 102. Namely, when the portable terminal moves into the wireless LAN area while engaging the call connection through the mobile communication network, the switching unit 104 controls to perform the call connection through the wireless LAN network which is low cost. Here, the switching unit 104 maintains an operation of a communication module corresponding to the mobile communication network that is already in operation and operates a communication module corresponding to the wireless LAN network to attempt a call connection to other user.

In addition, when it is determined that the mobile terminal moves out of the wireless LAN area, the switching unit 104 controls to perform the call connection through the mobile communication network.

The memory unit 106 of the portable terminal includes ROM, RAM, and Flash ROM. The Rom stores micro codes and various reference data of a program for processing and controlling the controller 100, the coverage identifying unit 102 and the switching unit 104.

The RAM, which is a working memory of the controller 100, stores temporary data generated during execution of various programs. In addition, the Flash ROM stores data, such as, a phone book, sent messages, received messages, and a touch input point of a user, which can be updated. Further, the memory unit 106 stores a reference value for determining a heterogeneous network area.

The input unit 108 includes numerous functions, such as, number buttons for 0 to 9, "MENU" button, "CANCEL" button, "OK" button, "CALL" button, "EXIT" button, "INTERNET" button, or a navigation key (or arrow key). A key input data corresponding to a key pressed by the user is provided to the controller 100.

The display unit 110 displays, for example, status information, a limited number of characters, and a high volume of videos and still images, which are generated during operation of the mobile terminal, and outputs information for notifying that a handoff occurs during the call connection according to the present invention. The display unit 110 can be implemented by, for example, using a color liquid crystal display (LCD) device or an active matrix organic light emitting diode (AMOLED) When the display unit 110 is equipped with a touch input device and is applied to the portable terminal having a touch input mode, the display unit 110 can serve as an input device.

The first communication unit 112 and the second communication unit 114 perform a function to transmit and receive a wireless signal of a data, which is input or output through an antenna (not shown). For example, when transmitting a data, channel coding and spreading is performed on a transmission data, which is then RF processed and transmitted. When receiving a data, a received RF signal is converted to a baseband signal and despreading and channel decoding is performed on the baseband signal to restore the data. When the first communication data 112 is a communication unit (or communication module) for the mobile communication network, the second communication unit 114 is a communication unit (or communication module) for a heterogeneous network.

The functions of the coverage identifying unit 102 and the switching unit 104 can be performed by the controller 100 of the portable terminal. However, for illustrative purposes, the coverage identifying unit 102 and the switching unit 104 are described as separate units. This example should not be construed as limiting the scope of the present invention and various modifications will be apparent to those skilled in the art within the scope of the invention. For example, the controller 100 can be configured to process all the functions described above.

Figure 2:
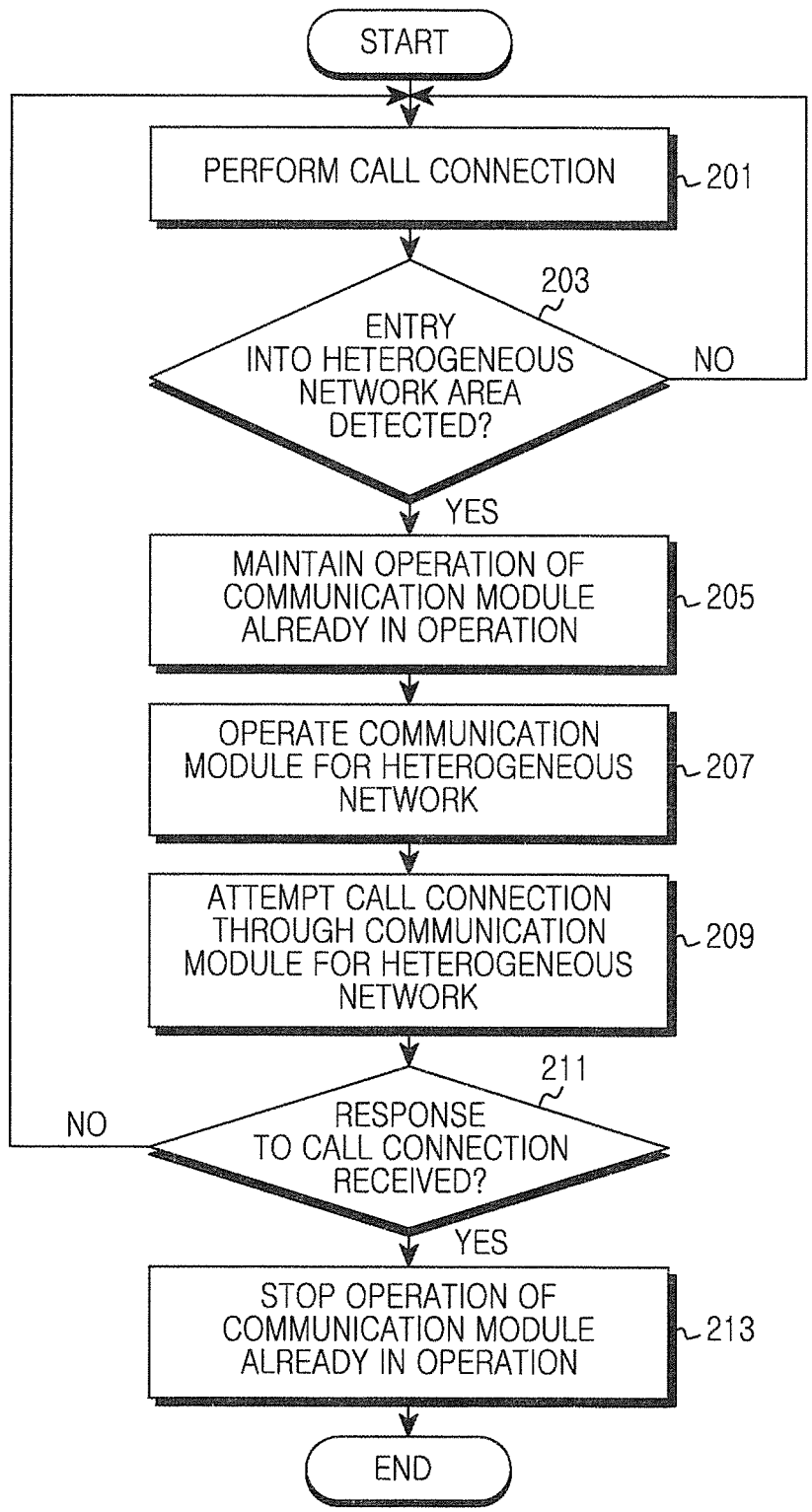
FIG. 2 illustrates a method of performing a handoff of a call connection to a wireless LAN network in a portable terminal according to an exemplary embodiment of the present invention.

FIG. 2 illustrates a method of performing a handoff of a call connection to a wireless LAN network in a portable terminal according to an exemplary embodiment of the present invention.

Referring to FIG. 2, the portable terminal proceeds to block 201 to perform the call connection. Here, the portable terminal performs the call connection with the other user through the mobile communication network. For example, the portable terminal can perform the call connection in a code division multiple access scheme (CDMA 2000 1x).

Next, the portable terminal proceeds to block 203 to identify whether the portable terminal moves into a heterogeneous network area, that is, the wireless LAN area. Here, the portable terminal detects the strength of the wireless LAN signal and compares the detected strength with a reference value for determining entry into the heterogeneous network area to identify whether the portable terminal moves in or out of the wireless LAN area included in the mobile communication network.

When it is determined that the portable terminal does not enter into the heterogeneous network area in block 203 (that is, when the all connection is retained in an area in which only the mobile communication network exists), the portable terminal performs the above block 201 again.

Meanwhile, when it is determined that the portable terminal enters into the heterogeneous network area in block 203 (when the portable terminal enters into the wireless LAN area included in the mobile terminal network while retaining the call connection), the portable terminal proceeds to block 205 to maintain an operation of the communication module that is already in operation, and proceeds to block 207 to operate the communication module corresponding to the heterogeneous network.

Next, the portable terminal proceeds to block 209 to attempt a call connection to the other user through the communication module corresponding to the heterogeneous network. Here, the portable terminal attempts the call connection to the other user via the communication module corresponding to the heterogeneous network while retaining the call connection through the mobile communication network, wherein the other user detects an incoming call over the heterogeneous network. Here, when attempting the call connection through the communication module corresponding to the heterogeneous network, the portable terminal can send a notification message (such as, SMS) to the other users to notify that the call connection is to be retained through the heterogeneous network.

Next, the portable terminal proceeds to block 211 to determine whether a response to the call connection is received from the other user. Here, the response means a response to a request from the portable terminal for the call connection through the heterogeneous network. When the response is received from the other user, the call connection can be maintained through the heterogeneous network.

When the response to the call connection is not received from the other user in block 211, the portable terminal proceeds to block 201 to maintain the call connection through the communication network that is already connected.

Alternatively, when the response to the call connection is received from the other user in block 211, the portable terminal proceeds to block 213 to stop an operation of the communication module that is already in operation (that is, disconnect the call connection through the mobile communication network) and performs the call connection through the heterogeneous network so that the call connection may not be disrupted but maintained.

Next, the portable terminal terminates a present algorithm.

Figure 3A:
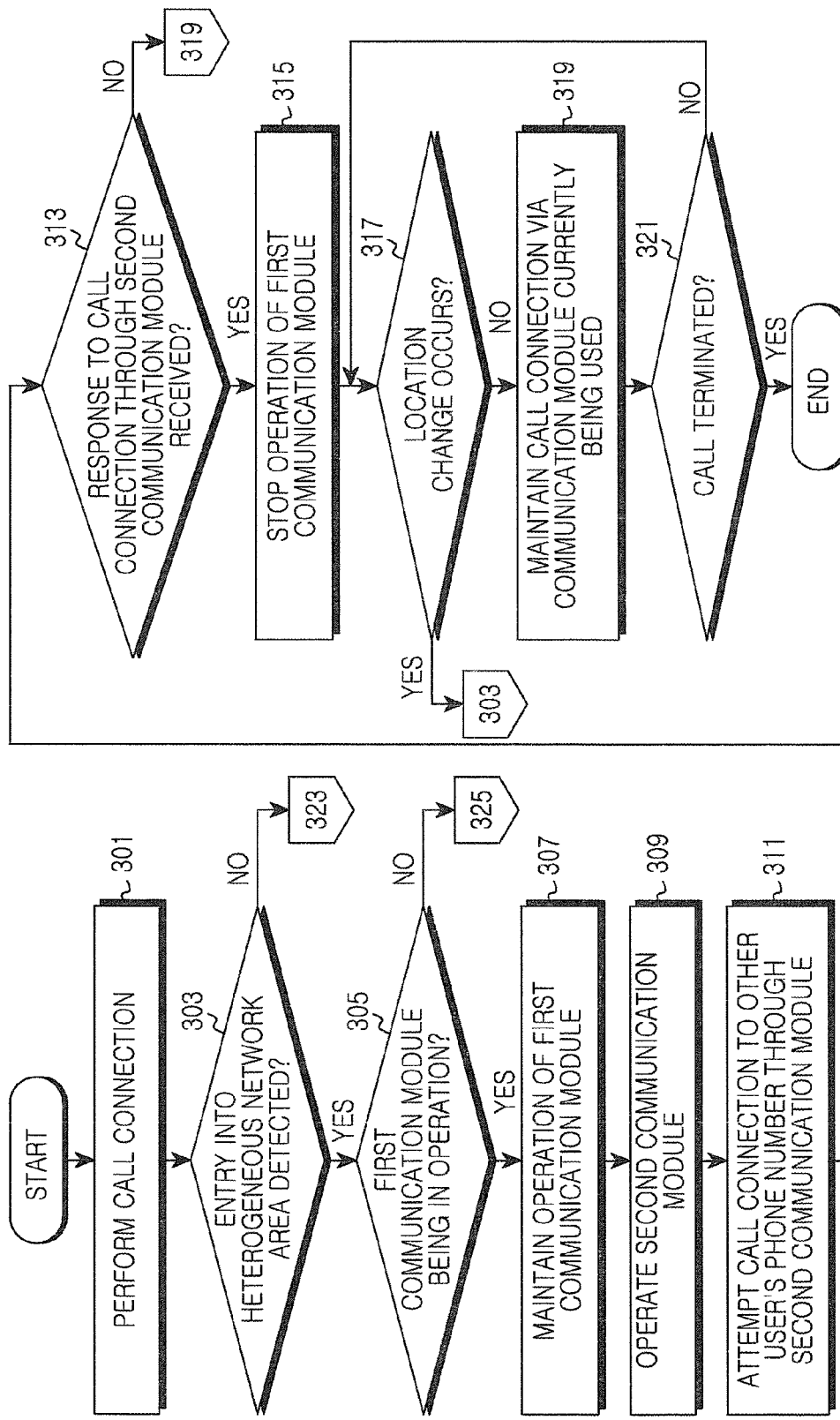
FIGS. 3A and 3B illustrate a method of performing a handoff of a call connection to a wireless LAN network in a portable terminal according to another exemplary embodiment of the present invention.
Figure 3B:
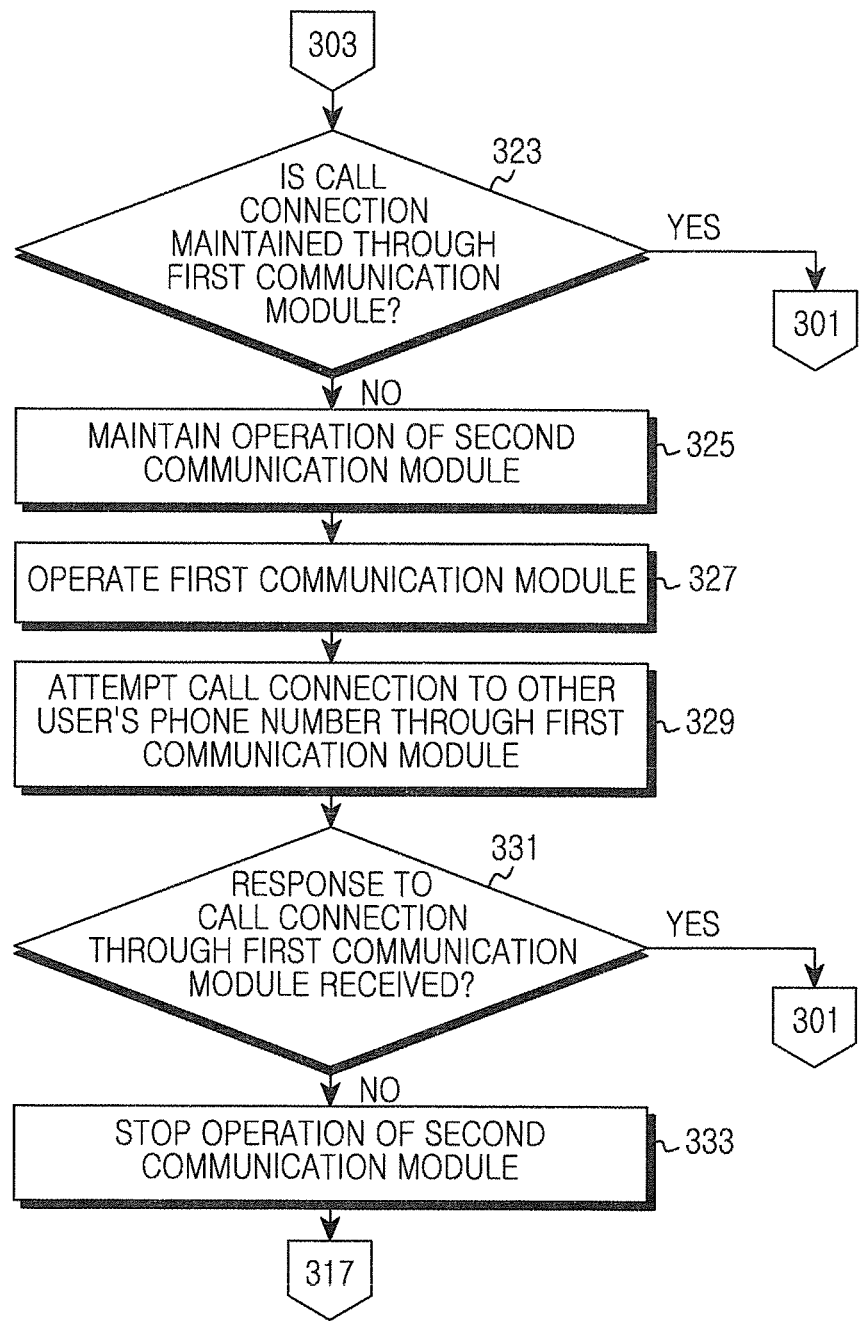

FIG. 3 illustrates a method of performing a handoff of a call connection to a wireless LAN network in a portable terminal according to another exemplary embodiment of the present invention.

Referring to FIG. 3, the portable terminal first performs the call connection with the other user in block 301.

Next, the portable terminal proceeds to block 303 to determine whether the portable terminal enters into the heterogeneous network area. Here, the heterogeneous network area is a different network included in the mobile communication network and, for illustrative purposes, the heterogeneous network is defined as the wireless LAN area in the present disclosure. Here, the portable terminal detects the strength of the wireless LAN signal to determine whether the portable terminal moves in or out of the heterogeneous network area.

When it is determined that the portable terminal enters into the heterogeneous network area in block 303, the portable terminal proceeds to block 305 to identify the communication module that performs the call connection that is already established. In other words, the portable terminal identifies whether the call connection is performed by an operation of the first communication module in block 305, wherein the first communication module can be the communication module corresponding to the wireless communication network. Also, the second communication module can be the communication module corresponding to the wireless LAN network. Thus, the portable terminal can be a dual mode terminal that can respectively connect to the mobile communication network and the wireless LAN network.

When it is determined that the first communication module is in operation in block 305, that is, the call connection is performed through the mobile communication network, the portable terminal proceeds to block 307 to maintain the operation of the first communication module corresponding to the mobile communication network. Next, the portable terminal proceeds to block 309 to operate the second communication module corresponding to the wireless LAN network.

Next, the portable terminal proceeds to block 311 to attempt the call connection to the other user through the second communication module. Here, the portable terminal can attempt the call connection to the other user by using a phone number of the other user with whom the call is connected as a called number and send a notification message to the other user (such as, SMS) to notify that the call connection, which is already connected through the mobile communication network, is to be maintained through the wireless LAN network.

Next, the portable terminal proceeds to block 313 to verify whether the response to the call connection is received from the other user. Here, the response means a response to a request from the portable terminal to maintain the call connection through the heterogeneous network. When the response is received from the other user, the call connection can be maintained through the heterogeneous network.

When the response to the call connection is not received from the other user in block 313, the portable terminal proceeds to block 319 to identify whether the call connection through the communications network that is already connected is terminated.

Alternatively, when the response to the call connection is received from the other user in block 313, the portable terminal proceeds to block 315 to stop the operation of the first communication module and perform the call connection through the second communication module.

Next, the portable terminal proceeds to block 317 to determine whether location change occurs. Here, the location change means a movement of the portable terminal from the mobile communication network to the wireless LAN network or movement of the portable terminal from the wireless LAN network to the mobile communication network. Namely, the portable terminal identifies whether the operation of the communication module is changed.

When it is determined that the location change occurs in block 317, the portable terminal performs block 303 again to change the operation of the communication module. That is, the portable terminal controls to perform a handoff according to a location of the portable terminal so that the call connection that is already established may not be disrupted.

Meanwhile, when it is determined that the location change does not occur in block 317, the portable terminal proceeds to block 319 to maintain the call connection via the communication module currently being used and then proceeds to block 321 to identify whether the call connection is terminated.

When it is determined that the call connection is not terminated in block 321, the portable terminal performs block 317 again.

Meanwhile, when it is determined that the call connection is terminated in block 321, the portable terminal terminates a present algorithm.

In addition, when it is determined that the portable terminal moves out of the heterogeneous network area in block 303, the portable terminal proceeds to block 323 to identify whether the call connection is maintained through the first communication module. Here, the portable terminal moving out of the heterogeneous network area can indicate a circumstance in which the portable terminal moves from the wireless LAN area to the mobile communication network area.

When it is determined that the portable terminal moves out of the heterogeneous network area while maintaining the call connection through the first communication module in block 323, the portable terminal performs block 301 again to perform the call connection through the mobile communication network by using the first communication module based on the determination that the portable terminal moves out of the heterogeneous network.

Meanwhile, when it is determined that the portable terminal moves out of the heterogeneous network area while maintaining the call connection through the second communication module in block 323, the portable terminal performs the call connection through the wireless LAN network, which corresponds to the heterogeneous network, and proceeds to block 325 to maintain the operation of the second communication module based on the determination that the portable terminal moves out of the heterogeneous network area.

Next, when the portable terminal moves out of the heterogeneous network, the call connection through the second communication module is terminated. Accordingly, the portable terminal proceeds to block 327 to operate the first communication module so that call connection is maintained even in case of the location change. Next, the portable terminal proceeds to block 329 to attempt the call connection to the other user through the first communication module operated as described above. Here, the portable terminal can perform the call connection to the other user by using a phone number of the other user with whom the call is connected as a called number and send a notification message to the other user (such as, SMS) to notify that the call connection, which is already established through the wireless LAN network, is to be maintained through the mobile communication network.

Next, the portable terminal proceeds to block 331 to identify whether the response to the call connection is received from the other user. Here, the response is a response to a request of the portable terminal for call connection through the mobile communication network. When the response is received from the other user, the call connection can be maintained through the mobile communication network.

When the response to the call connection is not received from the other user in block 331, the portable terminal proceeds to block 319 to identify whether the call connection through the communication network that is already connected is terminated.

Alternatively, when the response to the call connection is received from the other user in block 331, the portable terminal proceeds to block 333 to stop an operation of the second communication module and performs the call connection through the first communication module.

Next, the portable terminal proceeds to block 317 to determine whether the location change occurs.

Figure 4B:
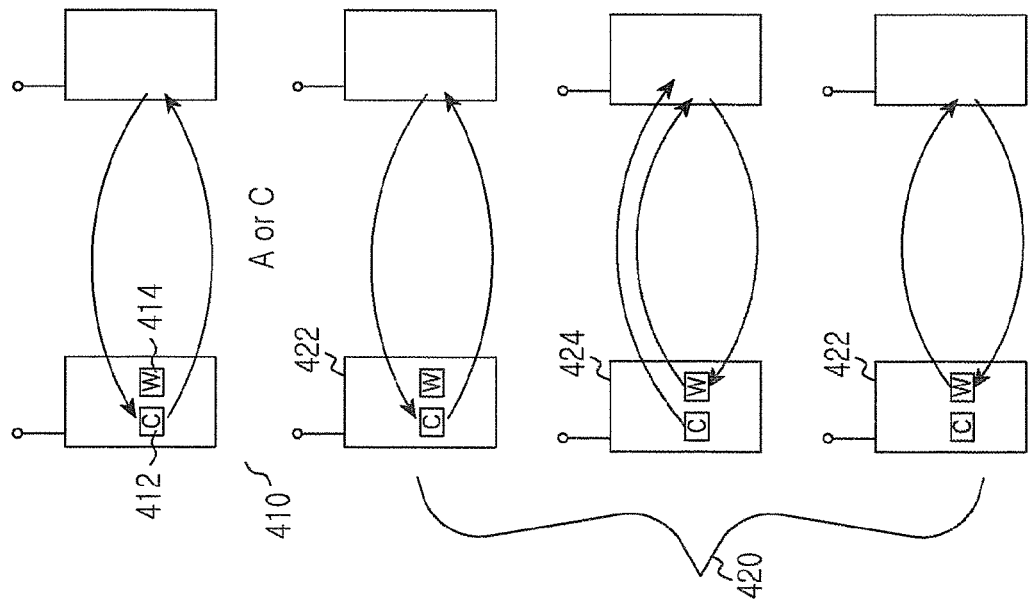
FIGS. 4A and 4B illustrate a process for allowing a handoff between a wireless LAN and a mobile communication network in a mobile communication system according to an exemplary embodiment of the present invention.
Figure 4A:
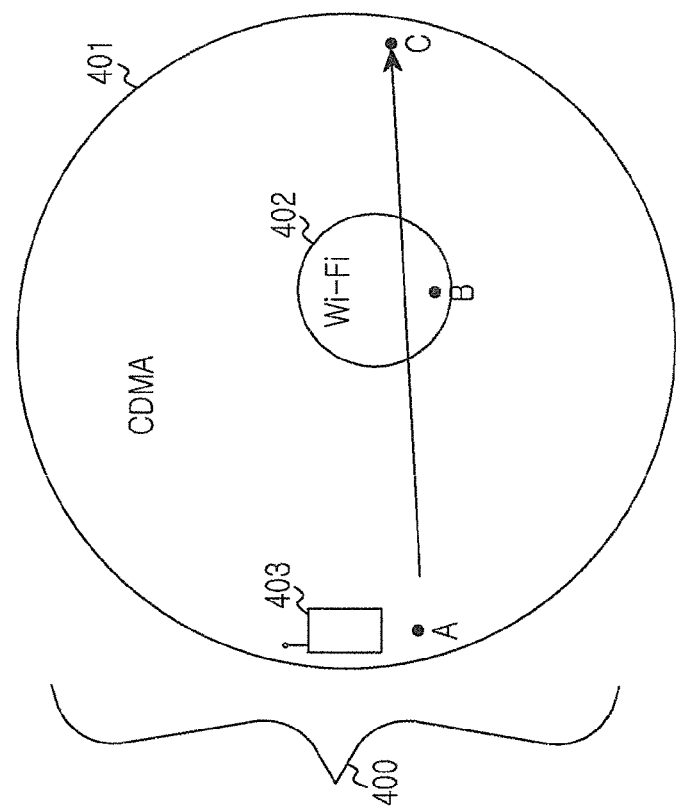

FIGS. 4A and 4B illustrate a process for allowing a handoff between a wireless LAN network and a mobile communication network in a mobile communication system according to an exemplary embodiment of the present invention.

FIG. 4A illustrates a configuration of a mobile communication system according to an exemplary embodiment of the present invention.

Referring to FIG. 4A, the mobile communication system 400 includes a mobile communication network 401, a wireless LAN network 402, and a portable terminal 403. It is assumed in the following description that the portable terminal 403 enters into the wireless LAN network 402 and moves out therefrom (that is, the portable terminal moves from the mobile communication network to the wireless LAN network and re-enters into the mobile communication network; path: A->B->C).

The portable terminal 403 can be a dual mode terminal capable of performing the call connection with the mobile communication network 401 and the wireless LAN network 402 through an unlicensed frequency.

FIG. 4B illustrates a process of a handoff in a portable terminal according to an exemplary embodiment of the present invention.

Referring to FIG. 4B, the portable terminal 410 can be a dual mode terminal that can have the call connection through the mobile telecommunication network 401 and the wireless LAN network 402, and thus, when the portable terminal 410 is located within the mobile communication network area, the call connection is performed through a first communication module 412, which corresponds to the mobile communication network 401, wherein a second communication module 414 corresponding to the wireless LAN network is deactivated. A reference numeral 412 indicates an operation process of the portable terminal that is located in an area A or an area C in FIG. 4A.

However, when the portable terminal enters into an area of the wireless LAN network 402 (that is, area B in FIG. 4A), the portable terminal 403, while maintaining the operation of first communication module to maintain the call connection through the mobile communication network (see '422'), operates the second communication module to attempt the call connection with the other user (see '424'). In other words, the portable terminal 403 maintains the call connection with the other user by the first communication module and the second communication module.

Next, when it is determined that the portable terminal 403 performs the call connection with the other user through the second communication module, the operation of the first communication module is terminated and the call connection with the second communication module, which is already established, is maintained (see '426'). The above operation is performed when the portable terminal 403 enters into the area B of FIG. 4A.

In addition, when the portable terminal moves out of the wireless LAN network, the portable terminal is to maintain the call connection with the other user through the first communication module. In order to perform the above operation, the portable terminal attempts the call connection with the other user by operating the first communication module while maintaining the call connection through the wireless LAN network by operating the second communication module. This operation is performed when the portable terminal is located in the area A or the area C in FIG. 4A described above.

In FIGS. 4A and 4B, a square box C within the portable terminal denotes a communication module for the mobile communication network and a square box w denotes a communication module for a wireless LAN network. A shaded square box denotes a module being in a deactivated state, wherein a reference numeral 420 is used to refer an operation of the terminal when the portable terminal moves from the area A to area C via the area B, as already described above.

Accordingly, the portable terminal, which performs the call connection through the mobile communication network, can perform the call connection through the wireless LAN network which is low cost by performing a handoff when the portable terminal moves into the wireless LAN area so that the call connection may not be disrupted but maintained.

As described above, the present disclosure provides an apparatus and a method for maintaining a call connection through the wireless LAN network when the portable terminal engaging the call connection through the mobile communication network moves into the wireless LAN area. According to the present disclosure, a call connection is attempted through a heterogeneous network while maintaining the call connection that is already connected so that the call connection that is already connected may not be disconnected but maintained.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A portable terminal comprising:
a first communication unit configured to perform a first call connection via a first network;
a second communication unit configured to perform a second call connection via a second network; and
a controller configured to:
control the first communication unit to establish the first call connection with a second terminal by using a phone number of the second terminal;
control the second communication unit to attempt the second call connection to the second terminal by using a phone number of the second terminal while maintaining the first call connection in response to an entry of the portable terminal into a second network area during the first call connection being identified;
receive, from the second terminal, a response to the second call connection;
if the response is a rejection for the second call connection, stop an operation of the second communication unit and maintain the first call connection; and
if a response is a acceptance for the second call connection, stop an operation of the first communication unit and maintain the second call connection.

2. The apparatus of claim 1, wherein the first network is a mobile communication network and the second network is a wireless LAN network.

3. The apparatus of claim 1, wherein, when it is detected that the portable terminal moves into the second network area and then moves out of the second network area, the controller is configured to:
attempt the first call connection by operating the first communication unit while maintaining the second call connection; and
when a response to the first call connection is received, stop an operation of the second communication unit.

4. The apparatus of claim 1, wherein the controller is configured to determine the second network area by comparing a strength of a signal in the second network with a pre-stored reference value for determining the second network area.

5. The apparatus of claim 1, wherein the controller is configured to attempt the second call connection to the second terminal by attempting, using the second communication unit, a call connection to a phone number of the second terminal with which the first call connection is being performed.

6. The apparatus of claim 5, wherein, when the second call connection is received, the second terminal is configured to determine the second call connection as a request to maintain the call connection through the second network and transmit a response to the request.

7. The apparatus of claim 5, wherein the apparatus is configured to send a notification message to the second terminal to notify that the call connection is to be retained through the second network.

8. A method of operating of a portable terminal, the method comprising:
- establishing, by operating a first communication unit, a first call connection with a second terminal using a phone number of a second terminal;
- attempting, by operating a second communication unit, a second call connection to the second terminal using a phone number of the second terminal while maintaining the first call connection in response to an entry of the portable terminal into a heterogeneous network area being identified;
- receiving, from the second terminal, a response to the second call connection;
- if the response is a rejection for the second call connection, terminating an operation of the second communication unit and maintain the first call connection; and
- if a response is a acceptance for the second call connection, terminating an operation of the first communication unit and maintaining the second call connection.

9. The method of claim 8, wherein the heterogeneous networks include a mobile communication network and a wireless LAN network.

10. The method of claim 8, further comprising:
- detecting whether the portable terminal moves into the heterogeneous network area and then moves out of the heterogeneous network area;
- attempting the first call connection by operating the first communication unit while maintaining the second call connection in response to detecting that the portable terminal moves out of the heterogeneous network; and
- terminating an operation of the second communication unit and maintaining the first call connection when a response to the first call connection is received.

11. The method of claim 8, wherein the heterogeneous network area is determined by comparing a strength of a signal in one of the networks with a pre-stored reference value for determining the heterogeneous network area.

12. The method of claim 8, wherein attempting the second call connection comprises attempting, using the second communication unit, a call connection to a phone number of the second terminal with which the first call connection is being performed.

13. The method of claim 12, wherein, when the second call connection is received, the second terminal determines the second call connection as a request to maintain the call connection through another of the networks and transmits a response to the request.

14. A system for supporting a handoff between heterogeneous networks, the system comprising a mobile communication network, a heterogeneous network, and a portable terminal configured to communicate with the mobile communication network and a wireless LAN network, the portable terminal comprising:
- a first communication unit configured to communicate with the mobile communication network;
- a second communication unit configured to communicate with the heterogeneous network;
- a coverage identifying unit configured to identify an entry of the portable terminal into a heterogeneous network area while operating the first communication unit; and
- a switching unit configured to attempt a call connection to a second terminal by using a phone number of the second terminal while maintaining an operation of the first communication unit when the entry of the portable terminal into the heterogeneous network area is identified;
- wherein, when a response to the call connection is received from the second terminal, the switching unit is configured to terminate the operation of the first communication unit and maintain the call connection with the second terminal using the second communication unit.

15. The system of claim 14, wherein the heterogeneous network includes the wireless LAN network.

16. The system of claim 14, wherein, when it is detected that the portable terminal moves into the heterogeneous network area and then moves out of the heterogeneous network area, the switching unit is configured to:
- attempt the call connection to the second terminal by operating the first communication unit while maintaining an operation of the second communication unit; and
- when a response to the call connection is received, terminate the operation of the second communication unit.

17. The system of claim 14, wherein the coverage identifying unit is configured to determine the heterogeneous network area by comparing a strength of a signal in the heterogeneous network with a pre-stored reference value for determining the heterogeneous network area.

18. The system of claim 14, wherein the switching unit is configured to attempt the call connection through the heterogeneous network by attempting, using the second communication unit, a call connection to a phone number of the second terminal with which the call connection through the mobile communication is being performed.

19. The system of claim 18, wherein, when the call connection through the heterogeneous network is received, the second terminal is configured to determine the call connection through the heterogeneous network as a request to maintain the call connection through the heterogeneous network and transmit a response to the request.

20. The system of claim 18, wherein the portable terminal is configured to send a notification message to the second terminal to notify that the call connection is to be retained through the heterogeneous network.

* * * * *